(12) United States Patent
Naccache et al.

(10) Patent No.: US 9,338,000 B2
(45) Date of Patent: May 10, 2016

(54) DEVICE AND METHOD FOR GENERATING KEYS WITH ENHANCED SECURITY FOR FULLY HOMOMORPHIC ENCRYPTION ALGORITHM

(75) Inventors: David Naccache, Paris (FR); Jean-Sébastien Coron, Rueil Malmaison (FR); Medhi Tibouchi, Paris (FR)

(73) Assignee: INGENICO GROUP, Paris (FR)

( * ) Notice: Subject to any disclaimer, the term of this patent is extended or adjusted under 35 U.S.C. 154(b) by 142 days.

(21) Appl. No.: 14/116,645

(22) PCT Filed: Apr. 30, 2012

(86) PCT No.: PCT/EP2012/057879
§ 371 (c)(1),
(2), (4) Date: Apr. 25, 2014

(87) PCT Pub. No.: WO2012/152607
PCT Pub. Date: Nov. 15, 2012

(65) Prior Publication Data
US 2014/0233731 A1    Aug. 21, 2014

(30) Foreign Application Priority Data
May 9, 2011    (FR) ..................... 11 53981

(51) Int. Cl.
*H04L 9/08*    (2006.01)
*H04L 9/00*    (2006.01)
*H04L 9/30*    (2006.01)

(52) U.S. Cl.
CPC .............. *H04L 9/0861* (2013.01); *H04L 9/008* (2013.01); *H04L 9/30* (2013.01)

(58) Field of Classification Search
CPC .......... H04L 9/0861; H04L 9/30; H04L 9/008
See application file for complete search history.

(56) References Cited

U.S. PATENT DOCUMENTS

| | | | |
|---|---|---|---|
| 4,200,770 A | 4/1980 | Hellman et al. | |
| 4,405,829 A | 9/1983 | Rivest et al. | |
| 4,633,036 A * | 12/1986 | Hellman et al. | 380/30 |
| 6,480,605 B1 * | 11/2002 | Uchiyama | H04L 9/3066 380/259 |
| 6,859,533 B1 * | 2/2005 | Wang et al. | 380/28 |
| 8,515,058 B1 * | 8/2013 | Gentry | H04L 9/008 380/28 |
| 2006/0050868 A1 * | 3/2006 | Bockes | G06F 7/723 380/28 |
| 2007/0156586 A1 * | 7/2007 | Kerschbaum | 705/50 |
| 2009/0046853 A1 * | 2/2009 | Hui | 380/44 |

OTHER PUBLICATIONS

Islam et al., Analysis of homomorphic properties of RSA-based cryptosystem for image sharing, Oct. 2010, IEEE 10th International Conference on Signal Processing (ICSP), pp. 1825-1828.*
C. Gentry: "Fully Homomorphic Encryption Using Ideal Lattices" in the proceedings of the 41st ACM Symposium on Theory of Computing (STOC), Bethesda, Maryland, USA, May 31-Jun. 2, 2009.

(Continued)

*Primary Examiner* — Kenneth Chang
(74) *Attorney, Agent, or Firm* — David D. Brush; Westman, Champlin & Koehler, P.A.

(57) ABSTRACT

There is proposed a method of generating secret and public keys vDGHV with enhanced security, implemented in a device including at least one microprocessor and a memory. The method includes generating a secret key SK corresponding the generation of a prime random number p or product of prime numbers.

5 Claims, 3 Drawing Sheets

(56) References Cited

OTHER PUBLICATIONS

Figure 1:
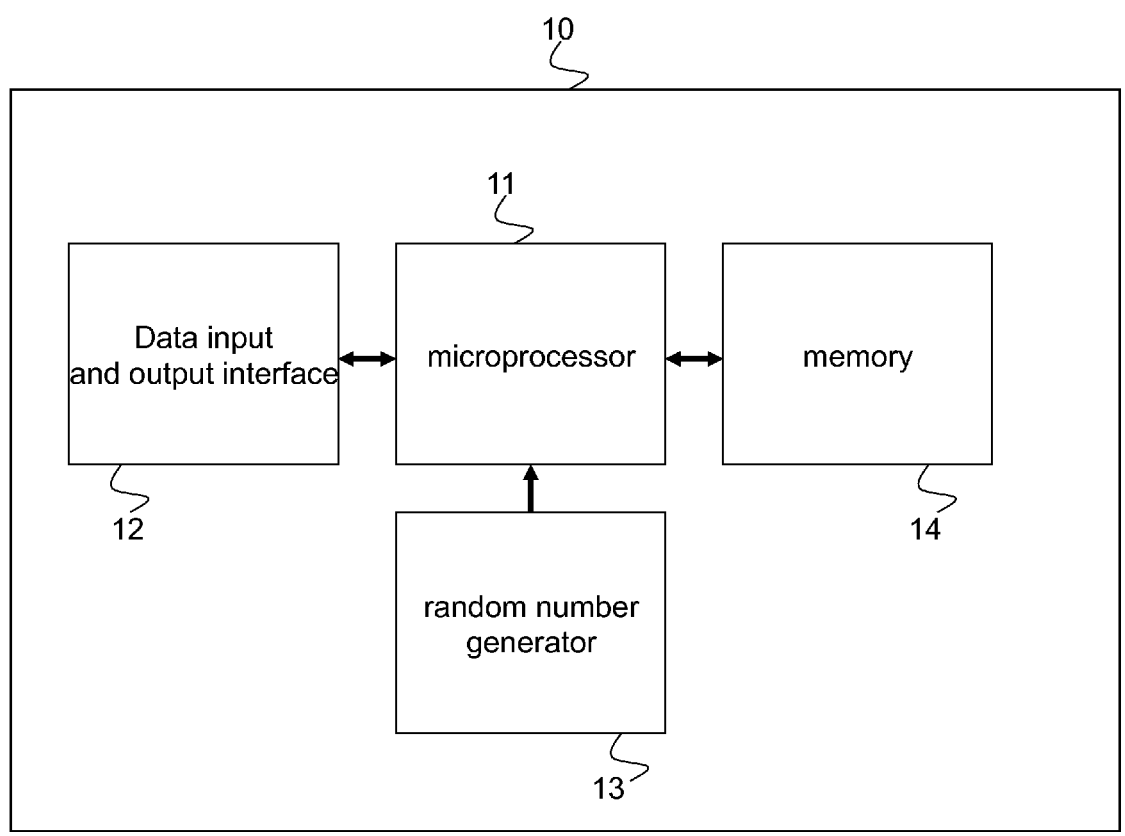

H.W. Lenstra Jr.: "Factoring Integers with Elliptic Curves", Annals of Mathematics, second series, vol. 126 (Nov. 1987), pp. 649 to 673.
Van Dijk et al.: "Fully Homomorphic Encryption over the Integers", May 30, 2010, Advances in Cryptology A Eurocrypt 2010, Springer Berlin Heidelberg, Berlin, Heidelberg, pp. 24-43, XP019142529.
Fontaine et al.: "A survey of Homomorphic Encryption for Nonspecialists", EURASIP Journal on Information Security, vol. 2007, Jan. 1, 2007, XP055012461.
Islam et al.: "A Homomorphic Method for Sharing Secret Images", Aug. 24, 2009, Digital Watermarking, Springer Berlin Heidelberg, Berlin, Heidelberg, pp. 121-135, XP019126469.
French Search Report dated Nov. 18, 2011 for corresponding French Patent Application No. FR 1153981, filed May 9, 2011.
International Search Report dated Jun. 4, 2012 for corresponding International Patent Application No. PCT/EP2012/057879, filed Apr. 30, 2012.
International Preliminary Report on Patentability and Written Opinion dated Jun. 4, 2012 for corresponding International Patent Application No. PCT/EP2012/057879, filed Apr. 30, 2012.

* cited by examiner

US 9,338,000 B2

DEVICE AND METHOD FOR GENERATING KEYS WITH ENHANCED SECURITY FOR FULLY HOMOMORPHIC ENCRYPTION ALGORITHM

1. CROSS-REFERENCE TO RELATED APPLICATIONS

This Application is a Section 371 National Stage Application of International Application No. PCT/EP2012/057879, filed Apr. 30, 2012, which is incorporated by reference in its entirety and published as WO 2012/152607 on Nov. 15, 2012, not in English.

2. FIELD OF THE INVENTION

The field of the invention is that of encryption devices known as fully homomorphic encryption devices.

More specifically, the invention pertains to the application of operations and digital processing for generating keys intended for a homomorphic encryption algorithm implemented in microprocessors, and to do so in such a way as to obtain a level of security that is significantly higher than in the prior art.

The invention more particularly pertains to infrastructures and devices for generating keys.

3. PRIOR ART

3.1. Public Key Cryptography

The cryptographic processing of digital data often makes it necessary to carry out operations of public key encryption.

In a public key encryption algorithm, the encryptor encrypts a message m, by means of an encryption algorithm E, in an encrypted message c=E(PK,m), using a public key, denoted as PK.

The intended recipient of the message decrypts the encrypted message c by applying a decryption function D such that m=D(SK,c) where SK is a secret key linked to the public key PK.

The public and secret keys (respectively PK and SK) are generated by means of a probabilistic algorithm called a key-generating algorithm.

For example, famous public key encryption algorithms are the algorithm known as the RSA described in the American U.S. Pat. No. 4,405,829, or the exchange of Diffie-Hellman keys described in the American U.S. Pat. No. 4,200,770.

3.2. Fully Homomorphic Public Key Cryptography

It is particularly valuable, for many practical applications, to have available a fully homomorphic public-key algorithm (known as the Algorithme Pleinement Homomorphique à Clé Publique or APHCP).

In addition to the algorithms E and D, an APHCP has two other algorithms denoted as ADD and MUL, which have the following properties for all messages m[1] and m[2]:

m[1]×m[2]=D(SK, MUL(E(PK,m[1]), E(PK,m[2])))
m[1]+m[2]=D(SK, ADD(E(PK,m[1]), E(PK,m[2])))

It is possible to show that even if the operations m[1]+m[2] and m[1]×m[2] are understood as modulo 2 operations (namely "+" represents the "exclusive-or" logical operator and "×" represents the "and" logical operator, it is possible to encode any complex processing of data whatsoever by means of these two operations alone.

The applications of the APHCP are numerous:
APHCPs can be used for example to perform computations on medical data for patients present in a database without in any way having to reveal their identities.
APHCPs make it possible to know the number of votes obtained by the candidates of an election without having to disclose the identity of the voters.
APHCPs enable the creation of anonymous payment protocols.
APHCPs enable the creation of a system of selling where the bid amount remains unknown, in order to prevent the vendor from seeking to raise the bidding. Only the biggest amount will be disclosed at the end of the procedure.

A first APHCP was published by Craig Gentry in the document D1 corresponding to the article: "*Fully Homomorphic Encryption Using Ideal Lattices*" in the proceedings of the 41$^{st}$ ACM Symposium on Theory of Computing (STOC), 2009. Since this system had the shortcoming of great complexity of implementation, a second APHCP method, based on arithmetic over the integers was proposed by Marten van Dijk, Craig Gentry, Shai Halevi, and Vinod Vaikuntanathan (vDGHV) in the document D2 corresponding to the article "Fully Homomorphic Encryption over the Integers" in the proceedings of the EUROCRYPT 2010 Symposium, pages 24 to 43.

The documents D1 and D2 are incorporated by reference into the present description.

3.3. vDGHV Scheme

In the vDGHV scheme, the secret-key and public-key generation method G starts by generating an odd number p corresponding to a secret key SK, known as a vDGHV secret key, and a public key PK, called a vDGHV public key corresponding to a collection of integers $x[i]=q[i] \times p+r[i]$ for i ranging from 0 to k, with q[i] and r[i] which are random number complying with the constraints specified in the document D2.

The numbers x[i] are such that r[i] is with a small size relative to x[i] (for example r[i] is a number with 80 or 100 bits).

One of the elements of the vDGHV public key, the element denoted as x[0], has a particular feature: for the element x[0], the following initial condition must be observed: r[0]=0.

In order to encrypt a bit m (via the algorithm E), the sender computes: c=m+2r+2 Z where:
r is a random number with a size somewhat similar to that of the r[i] values (the difference possibly being 1 bit or 2);
$Z=x[1]e[1]+\ldots+x[k]e[k]$ where the e[i] are the random bits (i.e. e[i]=0 or 1 randomly).

In order to decrypt an encrypted message c (via the algorithm D), the receiver computes: m=(c mod p) mod 2.

The implementing of the operations ADD and MUL uses the so-called "bootstrapping" technique (corresponding to a statistical inference technique) known to those skilled in the art and described in the document D2.

3.4. Implementation of the G Generating Method of vDGHV Keys by a Microprocessor Communicating with a Hardware Random Generator The vDGHV public-key generating method, referred to here above, is implemented in a hardware device 10, the hardware architecture of which is illustrated in FIG. 1.

A microprocessor 11 is connected to a data input and output interface means 12, a random generator 13 and a memory 14 in which the microprocessor reads the instructions encoding a program Pg implementing the G generating method of vDGHV keys.

When the system is started, the microprocessor 11 starts reading the program Pg in the memory 14. When it is being executed in the microprocessor 11, the program Pg generates the secret key SK corresponding to an odd number p and the public key PK=x[0], . . . , x[k].

Once the elements x[i] are obtained, the program Pg instructs the microprocessor 11 to communicate the elements x[0], . . . , x[k] through the data input and output interface 12 to another device.

Figure 2:
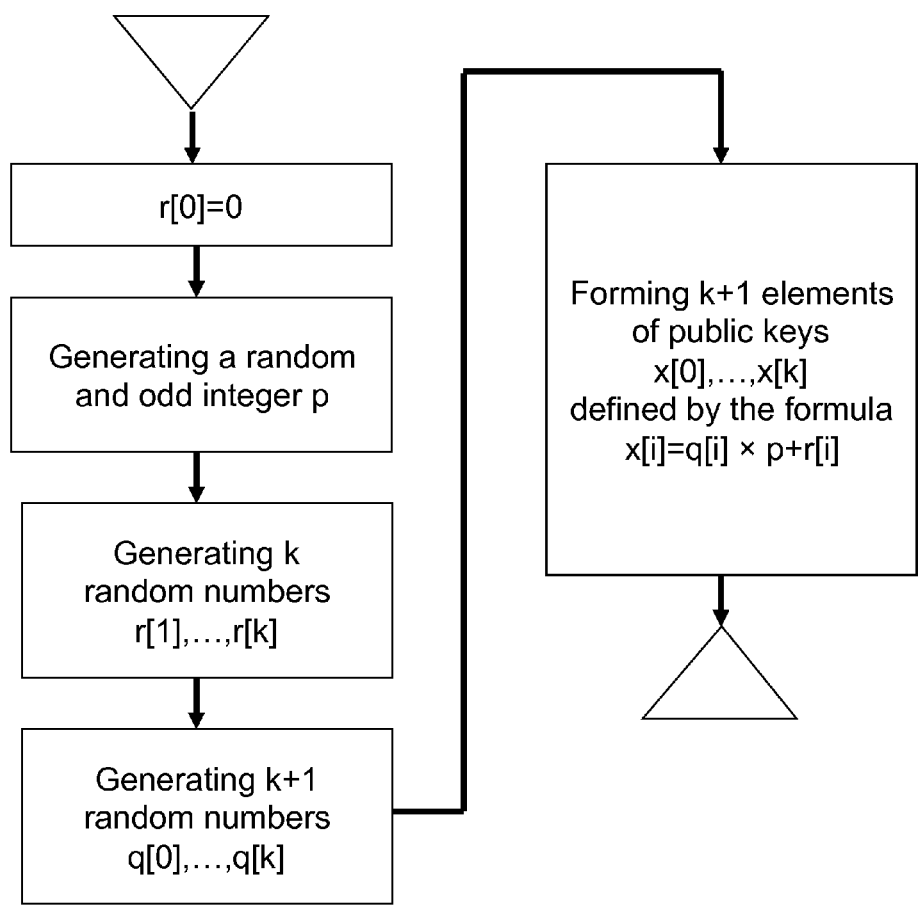

The G generating method of vDGHV keys, illustrated in FIG. 2 implements the following steps (in any order whatsoever):

Defining r[0]=0;
Generating an odd-parity random number p (corresponding to the secret key SK);
Generating k random numbers r[i] denoted as r[1], . . . , r[k];
Generating k+1 random numbers q[i] denoted as q[0], . . . , q[k].

Then, an obtaining step is implemented in order to determine the elements x[i]=q[i]p+r[i] for i ranging from 0 to k defining the public key PK.

3.5. Drawbacks of the Prior Art

The G generating method of vDGHV keys mentioned here above has a security flaw.

Indeed, since the secret key SK corresponding to the number p is a random odd-parity number, it is quite possible that the number p can be written as a product of prime factors:

$$p = p[1]^{a[1]} \times \ldots \times p[L]^{a[L]}.$$

Here, the numbers p[i] represents prime numbers and the integers a[i] represent powers, i.e. the number of times each p[i] appears in the secret key p.

It is known to those skilled in the art that schemes exist for entirely or partially decomposing p into prime factors. For example, a first scheme known as the Lenstra elliptic curve factoring enables the extraction of certain prime factors from integers. This first scheme is described in the article by Lenstra Jr., H. W. "*Factoring integers with elliptic curves*", Annals of Mathematics (2) 126 (1987), pages 649 to 673 and incorporated herein by reference. A second scheme known as the general number field sieve factoring algorithm can also be used to obtain a decomposition of this kind.

By applying a factoring scheme of this kind to the public key $x[0]=p \times q[0]=q[0] \times p[1]^{a[1]} \times \ldots \times p[L]^{a[L]}$, any attacker could discover at least one factor p[j] entering the composition of p.

The attacker can then compute the quantity t=x[1] mod p[j]. Indeed, t=x[1] mod p[j]=r[1] mod p[j].

From that point, two cases can arise:
1. If p[j]>r[1], then t=r[1], and the secret key can be determined directly by computing p=PGCD(x[0],x[1]−t).
2. If p[j]<4[1], then the attacker determines the value t=r[1] mod p[j], thus enabling him or her to make an exhaustive search for the value of r[1] at higher speed. In this case, the attacker will try to compute the quantity PGCD(x[0],x[1]−t−p[1]×i) for different values of i until a certain value i of the operation PGCD(x[0],x[1]−t−p[j]×i) reveals the secret key SK corresponding to the random odd-parity number p.

Thus, it was not obvious for those skilled in the art to be able to detect and formulate this problem of security inherent to the use of the G generating method of vDGHV keys. The invention is therefore at least partly a problem invention corresponding to the detection of this safety flaw.

4. SUMMARY OF THE INVENTION

The invention proposes a generating method of vDGHV secret and public keys with enhanced security, implemented in a device comprising at least one microprocessor and one memory, characterized in that it comprises a step for generating a secret key SK corresponding to the generation of a random number p that is difficult or impossible to factor.

Such a method, in a first embodiment, provides for the enhanced generation of keys by means of a fully homomorphic public-key encryption algorithm published in the document D2, modified so as to comprise the following steps:
(a) Defining r[0]=0;
(b) Generating a random prime number p, which is by definition impossible to factor;
(c) Generating k random numbers r[i] denoted as r[1], . . . , r[k];
(d) Generating k+1 random numbers q[i] denoted as q[0], . . . , q[k];
(e) Forming the elements of the public key x[i]=q[i] p+r[i] for i ranging from 0 to k;
(f) Returning the public key {x[0], . . . , x[k]} and the secret key p.

Thus, this method enhances security because of the increased impossibility of computation to retrieve the value of p.

One variant proposes an enhanced keys generating method for the fully homomorphic public-key encryption algorithm published in the document D2, modified so that it comprises the following steps:
(a) Defining r[0]=0;
(b) Generating a random number p that is difficult to factor;
(c) Generating k random numbers r[i] denoted as r[1], . . . , r[k];
(d) Generating k+1 random numbers q[i] denoted as q[0], . . . , q[k];
(e) Forming the elements of the public key x[i]=q[i] p+r[i] for i ranging from 0 to k;
(f) Returning the public key {x[0], . . . , x[k]} and the secret key p.

A random number p that is difficult to factor is a number whose size and composition are chosen in such a way that the factoring operation (which has exponential complexity in terms of computation time and memory resources) is unachievable by an attacker.

Another embodiment proposes a computation device comprising a microprocessor connected to data input and output interface means, a random generator and a memory, of which said microprocessor reads the instructions encoding an inventive program for generating keys working according to any one of the methods described here above.

5. LIST OF FIGURES

The hardware device for generating keys of the prior-art vDGHV method is described in FIG. 1.

The main steps of the G generating method of vDGHV keys are described in FIG. 2.

Figure 3:
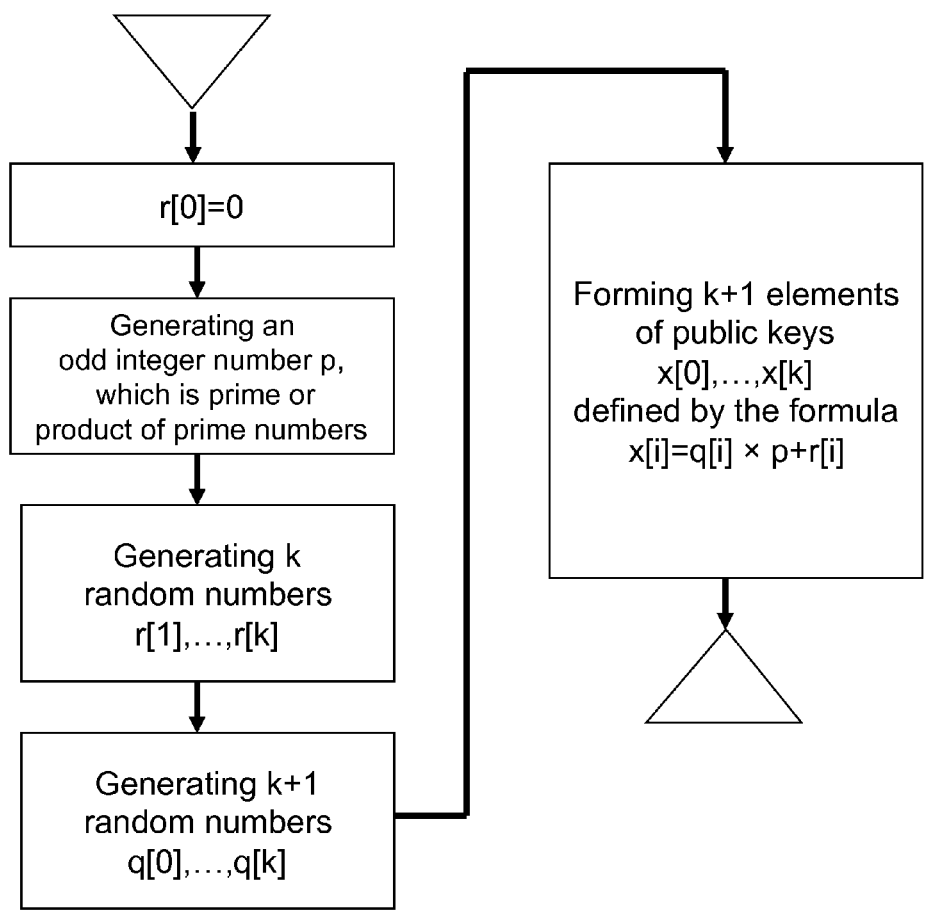

FIG. 3 presents steps of a keys generating method G' according to one embodiment of the invention.

6. DESCRIPTION OF THE INVENTION

The inventive generation of the elements x[i] of the public key PK with enhanced security for a vDGHV type algorithm on a hardware architecture is performed as follows.

The hardware architecture of the device of the invention (not shown) repeats the elements of the hardware architecture of the prior-art device 10 described in FIG. 1, namely a microprocessor 11 connected to a data input and output interface means 12, a random generator 13 and a memory 14, of which the microprocessor 11 reads the encoding instructions implementing the keys generating method G' according to one embodiment of the invention.

The keys generating method G' differs from the keys generating method G described here above by the step for generating the secret key.

When starting, the microprocessor 11 generates the secret key p according to one embodiment of the invention, and the corresponding elements x[0], ..., x[k] of the public key.

Once the elements x[i] have been generated, the device of the invention transmits the elements x[0], ..., x[k] to another device via the data input and output interface 12.

FIG. 3 presents steps of a keys generating method G' according to one embodiment of the invention:

Defining r[0]=0;

Generating a random number p that is difficult or impossible to factor;

Generating k random numbers r[i] denoted as r[1], ..., r[k];

Generating k+1 random numbers q[i] denoted as q[0], ..., q[k].

It can be noted that these steps can be carried out in any order whatsoever.

Then, an obtaining step is implemented in order to determine the elements x[i]=q[i] p+r[i] for i ranging from 0 to k defining the public key PK.

According to a first embodiment, the secret key SK corresponding to the number p is a secret prime number. The mode of generating such secret prime numbers p is known to those skilled in the art and is used for example to generate secret keys for the RSA algorithm.

According to a second embodiment, the secret key SK corresponding to the number p is a product of prime numbers which is such that the product is difficult to factor. The mode for generating such numbers p is known to those skilled in the art and is used for example to generate public keys for the algorithm RSA.

In both cases, the sizes of the parameters p, q[i] and r[i] follow the same recommendations as those described in the document D2.

Besides, any one of the variants of the method according to the invention described here above can also be implemented in hardware form in an FPGA (Field Programmable Gate Array) type component or an ASIC (Application-Specific Integrated Circuit) type component.

One or more embodiments of the invention overcome at least certain drawbacks of the prior art vDGHV technique.

At least one embodiment provides a technique enabling the generation of resistant secret and public keys for the APHCP scheme of vDGHV described here above.

At least one embodiment of the invention provides a technique that makes it possible to increase the level of security of the keys used for encryption and decryption.

The invention claimed is:

1. A method implemented by a first electronic device, said method comprising:

generating a secret key SK by a hardware random generator, said random generator being configured to generate said secret key SK corresponding to a random prime number p, or a product of prime numbers, whose size and composition are selected to increase difficulty for an attacker to perform a factoring-operation of said random prime number p, or said product of prime numbers;

generating first and second sets of random numbers;

generating a public key by a microprocessor using the secret key and instructions stored in a memory device, which when executed by the microprocessor implement a fully homomorphic public-key encryption algorithm based on arithmetic over integers, the secret and public keys being called vDGHV secret and public keys, with enhanced security, wherein the public key comprises a plurality of elements, and each element of the public key is generated as a function of the secret key, an element of the first set of random numbers and an element of the second set of random numbers; and transmitting said generated public key to a second electronic device using a data input and output interface of the first electronic device such that enhanced encryption and decryption associated with said secret and public keys can occur on messages communicated between said first and second electronic devices.

2. The method according to claim 1, wherein the method comprises the following steps:

(a) defining r[0]=0;

(b) generating said secret key SK corresponding to said random number p;

(c) generating k random numbers r[i] denoted as r[1], ..., r[k], corresponding to the first set;

(d) generating k+1 random numbers q[i] denoted as q[0], ..., q[k], corresponding to the second set;

(e) forming elements of the public key x[i]=q[i] p+r[i] for i ranging from 0 to k; and (f) returning said public key PK={x[0], ..., x[k]} and the secret key SK=p.

3. A first electronic device comprising:

a data input and output interface;

a microprocessor connected to the data input and output interface;

a hardware random generator, which is configured to generate a secret key SK by a secret key SK corresponding to a random prime number p, or a product of prime numbers, whose size and composition are selected to increase difficulty for an attacker to perform a factoring operation of said random prime number p, or said product of prime numbers, and to generate first and second sets of random numbers;

a memory device, storing instructions, which when executed by the microprocessor configure the microprocessor to:

generate a public key using the secret key according to a fully homomorphic public-key encryption algorithm based on arithmetic over integers, the secret and public keys being called vDGHV secret and public keys, with enhanced security, wherein the public key comprises a plurality of elements, and each element of the public key is generated as a function of the secret key, an element of the first set of random numbers and an element of the second set of random numbers; and transmit said generated public key to a second electronic device using the data input and output interface of the first device such that enhanced encryption and decryption associated with said secret and public keys can occur on messages communicated between said first and second electronic devices.

4. Computer-readable and non-transitory storage medium of a first electronic device comprising a set of instructions executable by a computer or a processor to implement a method comprising:
- receiving a secret key SK and first and second sets of random numbers, which are generated by a hardware random generator, said random generator being configured to generate said secret key SK corresponding to a random prime number p, or a product of prime numbers, whose size and composition are selected to increase difficulty for an attacker to perform a factoring operation of said random prime number p, or said product of prime numbers;
- generating a public key by the microprocessor using the secret key and implementing a fully homomorphic public-key encryption algorithm based on arithmetic over integers, called vDGHV secret keys and public keys, with enhanced security, wherein the public key comprises a plurality of elements, and each element of the public key is generated as a function of the secret key, an element of a first set of random numbers and an element of a second set of random numbers; and
- transmitting said generated public key to a second electronic device using a data input and output interface of the first electronic device such that enhanced encryption and decryption associated with said secret and public keys can occur on messages communicated between said first and second electronic devices.

5. A first electronic device comprising:
- a hardware circuit comprising a hardware random generator configured to generate a secret key SK corresponding to a random prime number p, or a product of prime numbers, whose size and composition are selected to increase difficulty for an attacker to perform a factoring operation of said random prime number p, or said product of prime numbers, and to generate first and second sets of random numbers, the hardware circuit being configured to generate a public key using the secret key according to a fully homomorphic public-key encryption algorithm based on arithmetic over integers, the secret and public keys being called vDGHV secret and public keys, with enhanced security, wherein the public key comprises a plurality of elements, and each element of the public key is generated as a function of the secret key, an element of the first set of random numbers and an element of the second set of random numbers; and
- an input and output interface configured to transmit the public key, generated by the hardware circuit, to a second electronic device such that enhanced encryption and decryption associated with said generation of said secret and public keys can occur on messages communicated between said first and second electronic devices.

* * * * *